US011474222B2

(12) United States Patent
Chen et al.

(10) Patent No.: US 11,474,222 B2
(45) Date of Patent: Oct. 18, 2022

(54) ACTIVE THREE-DIMENSIONAL SCENE INFORMATION ACQUISITION METHOD BASED ON DIMENSIONALITY-REDUCED SPARSE REPRESENTATION

(71) Applicant: SUN YAT-SEN UNIVERSITY, Guangdong (CN)

(72) Inventors: Chongyu Chen, Guangdong (CN); Liang Lin, Guangdong (CN)

(73) Assignee: SUN YAT-SEN UNIVERSITY, Guangzhou (CN)

( * ) Notice: Subject to any disclaimer, the term of this patent is extended or adjusted under 35 U.S.C. 154(b) by 403 days.

(21) Appl. No.: 16/630,847

(22) PCT Filed: Jul. 13, 2017

(86) PCT No.: PCT/CN2017/092826
§ 371 (c)(1),
(2) Date: Jan. 13, 2020

(87) PCT Pub. No.: WO2019/010679
PCT Pub. Date: Jan. 17, 2019

(65) Prior Publication Data
US 2020/0142054 A1 May 7, 2020

(51) Int. Cl.
*G01S 7/539* (2006.01)
*G01S 13/00* (2006.01)
(52) U.S. Cl.
CPC ............ *G01S 7/539* (2013.01); *G01S 13/003* (2013.01)

(58) Field of Classification Search
CPC ........ G01S 7/539; G01S 13/003; G01S 13/89; G01S 15/89; G01S 15/42
See application file for complete search history.

(56) References Cited

U.S. PATENT DOCUMENTS

| 9,978,013 | B2* | 5/2018 | Kaufhold | ............. G06N 3/0463 |
| 10,018,709 | B2* | 7/2018 | Bialer | .................. G01S 13/931 |
| 2011/0222781 | A1* | 9/2011 | Nguyen | .................. G06V 20/13 382/218 |
| 2021/0349470 | A1* | 11/2021 | McDaniel | .......... G05B 13/0265 |

FOREIGN PATENT DOCUMENTS

CN 102221697 A 10/2011

OTHER PUBLICATIONS

International Search Report of PCT Patent Application No. PCT/CN2017/092826 dated Apr. 19, 2018.

* cited by examiner

Primary Examiner — Khanh C Tran

(57) ABSTRACT

An active three-dimensional scene information acquisition method based on dimensionality-reduced sparse representation is provided. The method jointly processes multiple one-dimensional active detection signals collected synchronously to achieve three-dimensional positioning of objects in a detected scene or three-dimensional reconstruction of a scene structure. Through an active detection system equipped with one transmitter and multiple receivers, simultaneous three-dimensional positioning of multiple targets in a scene or three-dimensional reconstruction of the geometry of the scene is achieved.

5 Claims, 3 Drawing Sheets

ACTIVE THREE-DIMENSIONAL SCENE INFORMATION ACQUISITION METHOD BASED ON DIMENSIONALITY-REDUCED SPARSE REPRESENTATION

TECHNICAL FIELD

The disclosure relates to the field of digital signal processing, and more particularly, to an active three-dimensional scene information acquisition method based on dimensionality-reduced sparse representation.

BACKGROUND

Target positioning and scene reconstruction technologies based on active detection have a wide range of applications in transportation, exploration, and aviation. People have developed various radar devices to meet the detection needs of different scenes. A traditional three-point positioning method realizes the acquisition of three-dimensional position information of a single target by analyzing time when a target echo reaches different measurement points. Although the number of sensors required by the method is greater than the number of targets, its application is still very wide. Multiple-input multiple-output radar systems achieve simultaneous positioning of multiple targets by deploying transmitters and receivers at different locations. However, such systems have high requirements for the directionality of transmitted signals, and the number of targets that can be detected is still not greater than the number of sensors deployed. In indoor scenes where it is inconvenient to deploy radar, people mainly locate the target by carrying a device with a radio frequency identification tag, and acquire position information of an object by analyzing arrival time of the device to different sensors. For targets that do not carry their own devices, people need to deploy a large number of sensors in a grid pattern around a detected scene, and sense the position information of the object through the strength of an object transmitting signal received by the sensor. The method is very sensitive to noise and cannot acquire information about multiple objects at the same time. And the arrangement cost of a large number of sensors is high and the extensibility is poor.

SUMMARY

The disclosure provides an active three-dimensional scene information acquisition method based on dimensionality-reduced sparse representation. By deploying a transmitter and a small number of one-dimensional detection signal receivers, the method may acquire three-dimensional positions of multiple targets in a scene, or obtain a three-dimensional structure of a detected scene.

In order to achieve the above technical effects, the technical solution of the disclosure is as follows.

An active three-dimensional scene information acquisition method based on dimensionality-reduced sparse representation may include the following steps.

S1: An active detection system is calibrated, the active detection system including a transmitter and multiple one-dimensional detection signal receivers.

S2: A detected scene is detected, and a multi-channel detection signal within a detection period is collected.

S3: A sparse representation optimization model is established and solved according to a calibration result and the collected detection signal.

Further, a specific process of step S1 may be that:

the transmitter and the receivers of the active detection system face towards an open area in which there is only one object with a size not greater than $h_1 \times h_2 \times h_3$, the transmitter is started to transmit a detection signal s, a waveform of a single reflected signal received by each receiver is recorded, the received waveforms being recorded as $s_1, s_2, \ldots s_n$, where n is a number of the receivers, and the calibration for the active detection system is completed after completely recording the received waveforms.

Further, a specific process of step S2 may be that:

the multiple receivers are placed at a position that is not coplanar with the transmitter, a distance from the transmitter being not less than L, and for a detection signal with a wave velocity of v and a duration of t, $L \geq vt$;

the transmitter and the receivers face the detected scene, when target information in the scene is to be acquired, step S21 is activated, and when a three-dimensional structure of the scene is to be acquired, step S22 is activated;

S21: a detection signal s is transmitted to a scene without a target, signals $b_1, b_2, \ldots, b_n$ received by each receiver are recorded, when a target appears in a scene, a detection signal s is transmitted to the scene with the target, and signals $z_1, z_2, \ldots, z_n$ received by each receiver are recorded, $y_1 = z_1 - b_1$, $y_2 = z_2 - b_2, \ldots, y_n = z_n - b_n$; and S22: a detection signal s is transmitted to a scene, and signals $y_1, y_2, \ldots, y_n$ received by each receiver are recorded.

Further, a specific process of step S3 may be that:

S31: the detected scene is divided into multiple voxels having a size of $h_1 \times h_2 \times h_3$, and establishing sparse representation dictionaries $D_1, D_2, \ldots, D_n$ are established, wherein a $j^{th}$ column of elements of the $j^{th}$ dictionary $D_i$ is a waveform that should be received by the $j^{th}$ receiver when the $j^{th}$ voxel has an object, and may be approximated by $s_i$ translating to a corresponding position;

S32: an overall sparse representation dictionary $$D = \begin{bmatrix} D_1 \\ D_2 \\ \ldots \\ D_n \end{bmatrix}$$

and an overall received signal $$y = \begin{bmatrix} y_1 \\ y_2 \\ \ldots \\ y_n \end{bmatrix}$$

are constructed, the dictionary D being a matrix of p×q, a noise level $\sigma_D$ of the dictionary and a noise level $\sigma_s$ of the received signal are estimated, if $\sigma_D^2/\|D\|_F^2 \leq \tau$ and $\sigma_s^2/\|y\|_2^2 \leq \tau$, step S33 is activated, otherwise, step S34 is activated, a threshold $\tau$ being 0.05;

S33: an optimization model $$\min_x \frac{1}{2}\|y - DWx\|_2^2 + \lambda \|Wx\|_1$$

is established and solved, where $\lambda = \sigma_s \sqrt{2\log q}$, so as to obtain three-dimensional information Wx of the scene; and S34: it is assumed that m=min(p,q), and an appropriate k is taken, so that $$\sum_{i=1}^{k} \omega_i^2 \Big/ \sum_{i=1}^{m} \omega_i^2 \approx \sigma_s^2 / \|y\|_2^2;$$

singular value decomposition is performed on the dictionary D to obtain $D = U\Sigma V^T$; $D_k = U_k \Sigma_k V_k^T$, where $U_k$ is the first k columns of U, $V_k$ is the first k columns of V, and a diagonal matrix $\Sigma_k$ is an intersection matrix of the first k rows and first k columns of $\Sigma$; and a dimensionality-reduced sparse representation optimization model $$\min_x \frac{1}{2} \left\| U_k^T y - \sum_k V_k^T W x \right\|_2^2 + \lambda \|Wx\|_1$$

is established and solved, where $\lambda = \sigma_s^2 \log q$, so as to obtain three-dimensional information Wx of the scene.

Further, in steps S33 and S34, if a target information in the scene is acquired, a matrix W may be an identity matrix; and if a structure information of the scene is acquired, a matrix W may be a transformation matrix that makes Wx sparse.

Compared with the conventional art, the disclosure has the following advantages.

The disclosure jointly processes multiple one-dimensional active detection signals collected synchronously to achieve three-dimensional positioning of objects in a detected scene or three-dimensional reconstruction of a scene structure. Through an active detection system equipped with one transmitter and multiple receivers, simultaneous three-dimensional positioning of multiple targets in a scene or three-dimensional reconstruction of the geometry of the scene is achieved. In the disclosure, three-dimensional information of the detected scene is divided according to voxels, thereby remodeling the problem of acquiring three-dimensional information into multiple one-dimensional signal de-aliasing problems, and transforming into a convex optimization problem to solve under a sparse representation frame. When the received signal is noisy, the sparse representation model of the disclosure is further transformed into a dimensionality-reduced sparse representation model. Relevant experiments show that the proposed method breaks through the requirement for the number of sensors in the traditional three-point positioning method on the problem of simultaneous positioning of multiple targets. In the acquisition of three-dimensional scene information, the proposed method only requires multiple one-dimensional signal sensors and may be derived into a variety of high-efficiency, low-cost, and extensible active detection schemes. The dimensionality reduction model of the proposed method may well handle situations with high noise levels.

DETAILED DESCRIPTION OF THE EMBODIMENTS

Figure 1:
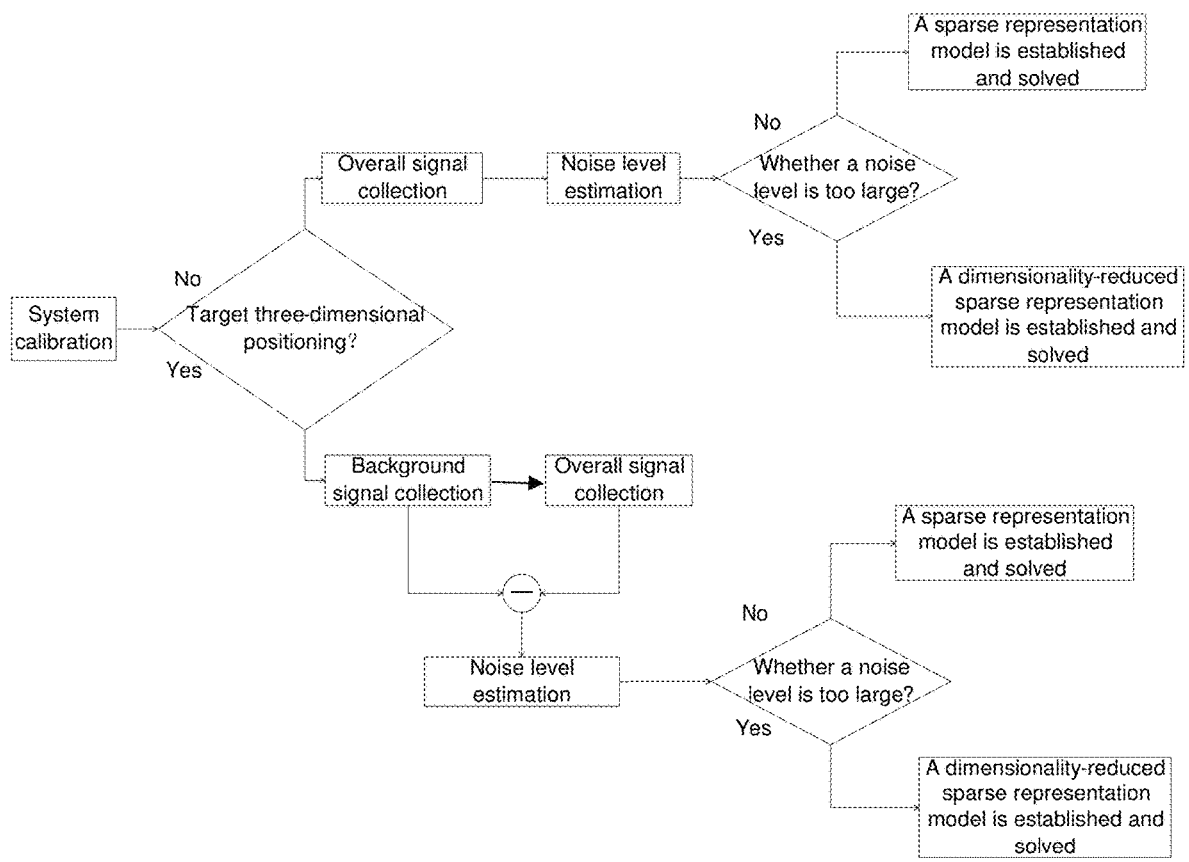
FIG. 1 is a flowchart of a method of the disclosure.
Figure 2:
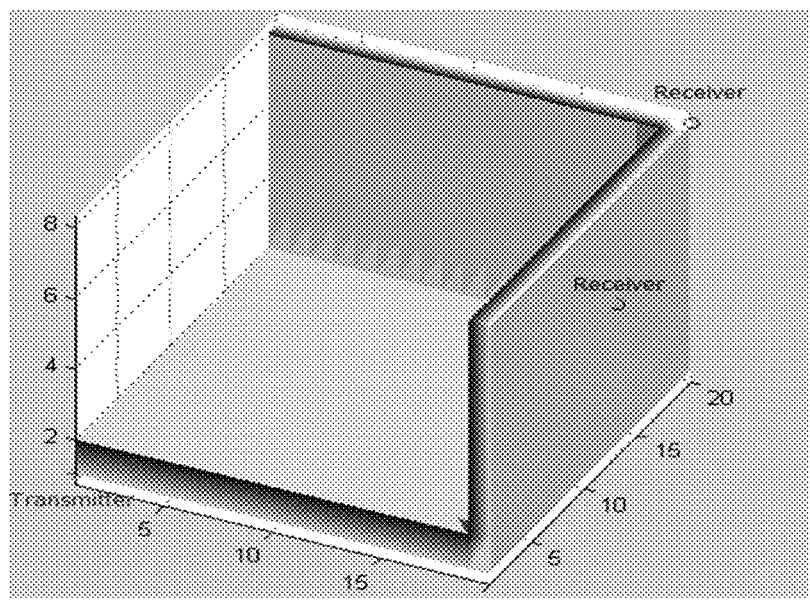
FIG. 2 is a schematic arrangement diagram of an indoor positioned scene.

The drawings are only for illustrative purposes and should not be construed as limiting the patent.

In order to better illustrate the present embodiment, some components in the drawings may be omitted, enlarged, or reduced, and do not represent the size of an actual product.

It will be understood by those skilled in the art that some well-known structures and their descriptions in the drawings may be omitted.

The technical solution of the disclosure will be further described below with reference to the accompanying drawings and embodiments.

Embodiment 1

As shown in FIG. 1, anactive three-dimensional scene information acquisition method based on dimensionality-reduced sparse representation includes the following steps.

S1: An active detection system is calibrated, the active detection system including a transmitter and multiple one-dimensional detection signal receivers.

S2: A detected scene is detected, and a multi-channel detection signal within a detection period is collected.

S3: A sparse representation optimization model is established and solved according to a calibration result and the collected detection signal.

Further, a specific process of step S1 is that:

the transmitter and the receivers of the system face towards an open area in which there is only one object with a size not greater than $h_1 \times h_2 \times h_3$, the transmitter is started to transmit a detection signal s, a waveform of a single reflected signal received by each receiver is recorded, the received waveforms being recorded as $s_1, s_2, \ldots s_n$, where n is the number of receivers, and the calibration for the system is completed after completely recording the received waveforms.

A specific process of step S2 is that:

the multiple receivers are placed at a position that is not coplanar with the transmitter, a distance from the transmitter being not less than L, and for a detection signal with a wave velocity of v and a duration of t, $L \geq vt$;

the transmitter and the receivers face the detected scene, when target information in the scene is to be acquired, step S21 is activated, and when a three-dimensional structure of the scene is to be acquired, step S22 is activated;

S21: a detection signal s is transmitted to a scene without a target, signals $b_1, b_2, \ldots, b_n$ received by each receiver are recorded, when a target appears in a scene, a detection signal s is transmitted to the scene with the target, and signals $z_1, z_2, \ldots, z_n$ received by each receiver are recorded, $y_1 = z_1 - b_1$, $y_2 = z_2 - b_2, \ldots, y_n = z_n - b_n$; and S22: a detection signal s is transmitted to a scene, and signals $y_1, y_2, \ldots, y_n$ received by each receiver are recorded.

A specific process of step S3 is that:

S31: the detected scene is divided into multiple voxels having a size of $h_1 \times h_2 \times h_3$, and sparse representation dictionaries $D_1, D_2, \ldots, D_n$ are established, wherein a $j^{th}$ column of elements of the $i^{th}$ dictionary $D_i$ is a waveform that should be received by the $j^{th}$ receiver when the $j^{th}$ voxel has an object, and may be approximated by $s_i$ translating to a corresponding position;

S32: an overall sparse representation dictionary $$D = \begin{bmatrix} D_1 \\ D_2 \\ \ldots \\ D_n \end{bmatrix}$$

and an overall received signal $$y = \begin{bmatrix} y_1 \\ y_2 \\ \ldots \\ y_n \end{bmatrix}$$

are constructed, the dictionary D being a matrix of p×q, a noise level $\sigma_D$ of the dictionary and a noise level $\sigma_s$ of the received signal are estimated, if $\sigma_D^2/\|D\|_F^2 \le \tau$ and $\sigma_s^2/\|y\|_2^2 \to \tau$, step S33 is activated, otherwise, step S34 is activated, a threshold $\tau$ being 0.05;

S33: an optimization model $$\min_x \frac{1}{2}\|y - DWx\|_2^2 + \lambda\|Wx\|_1$$

is established and solved, where $\lambda = \sigma_s\sqrt{2\log q}$, so as to obtain three-dimensional information Wx of the scene; and S34: it is assumed that m=min (p,q), and an appropriate k is taken, so that $$\sum_{i=1}^{k} \omega_i^2 \Big/ \sum_{i=1}^{m} \omega_i^2 \approx \sigma_s^2/\|y\|_2^2;$$

singular value decomposition is performed on the dictionary D to obtain $D = U\Sigma V^T$; $D_k = U_k \Sigma_k V_k^T$, where $U_k$ is the first k columns of U, $V_k$ is the first k columns of V, and a diagonal matrix $\Sigma_k$ is an intersection matrix of the first k rows and first k columns of $\Sigma$; and a dimensionality-reduced sparse representation optimization model $$\min_x \frac{1}{2}\left\|U_k^T y - \sum_k V_k^T Wx\right\|_2^2 + \lambda\|Wx\|_1$$

is established and solved, where $\lambda = \sigma_s^2 \log q$, so as to obtain three-dimensional information Wx of the scene.

A scene of indoor positioning using ultrasonic wave is simulated on a computer. The scene size is 10 m×10 m×4 m, and evenly divided into 3200 voxels (the voxel size is 0.5 m×0.5 m×0.5 m), the speed of sound propagation is set to 350 m/s, and a system sampling rate is 7000 samples/second. A coordinate axis is established with one corner of the room as an origin, and a transmitter is placed at the origin. In addition, four non-coplanar receivers are placed with coordinates of (10, 10, 4), (6.5, 10, 2.5), (10, 6.5, 2.5) and (10, 10, 0.5).

Figure 3A:
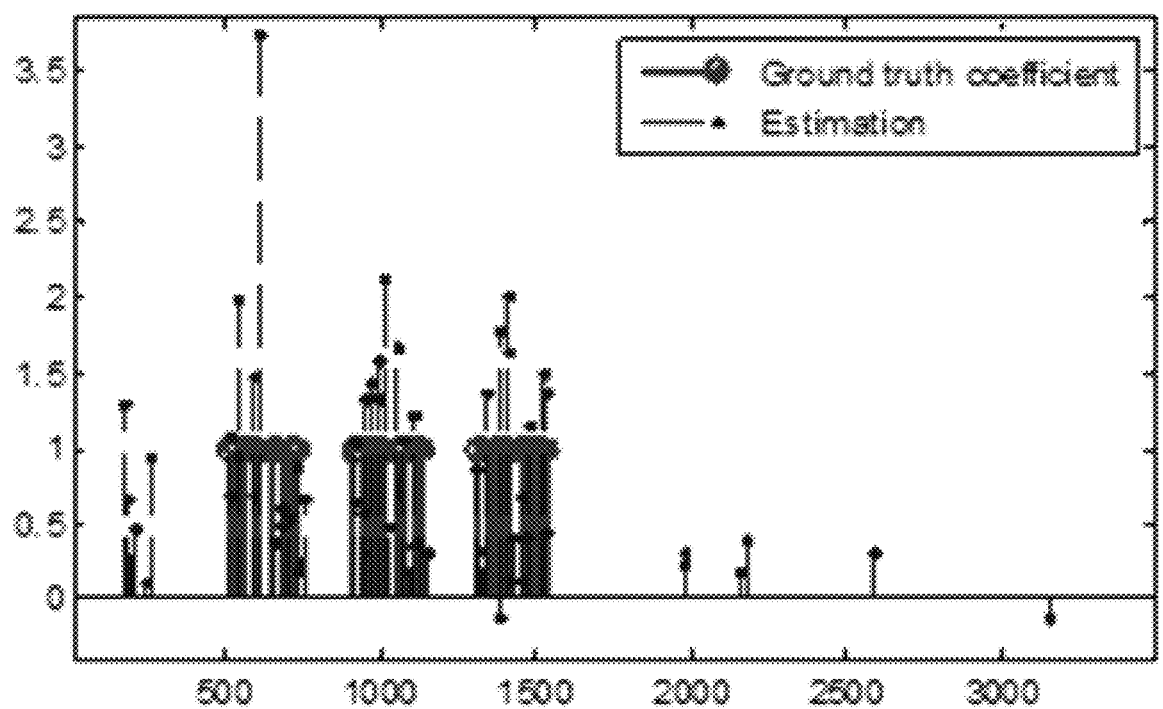
FIG. 3 is a coefficient solved by different models.
Figure 3B:
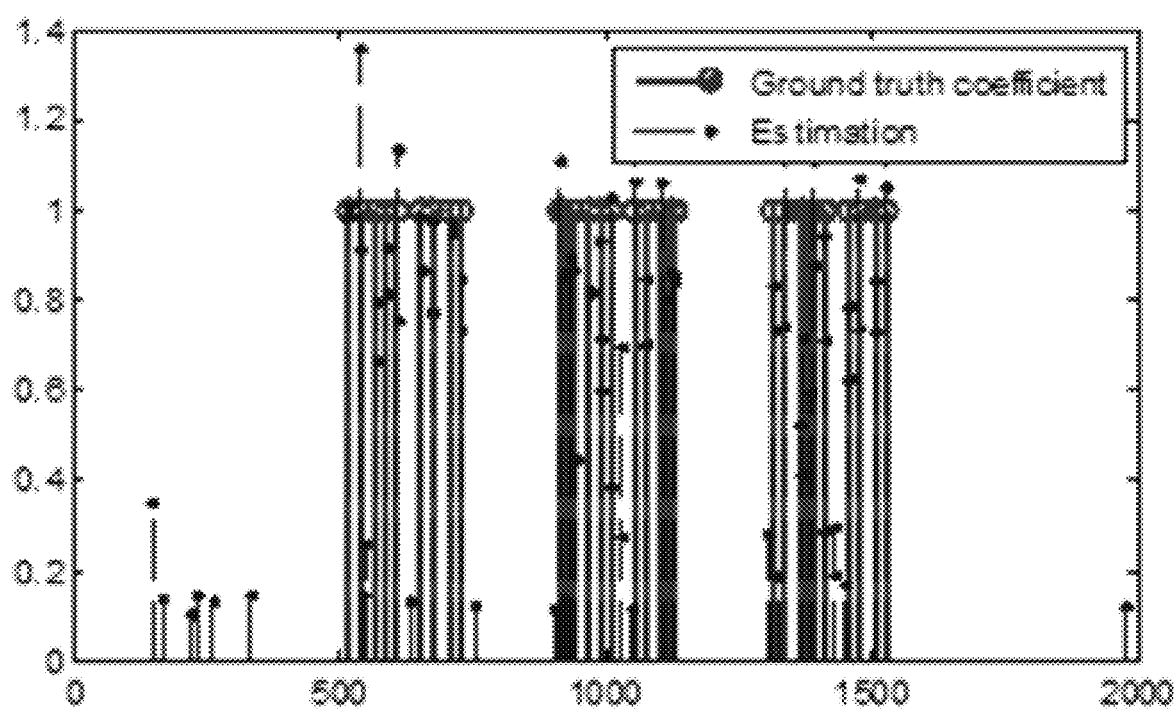
Figure 4:
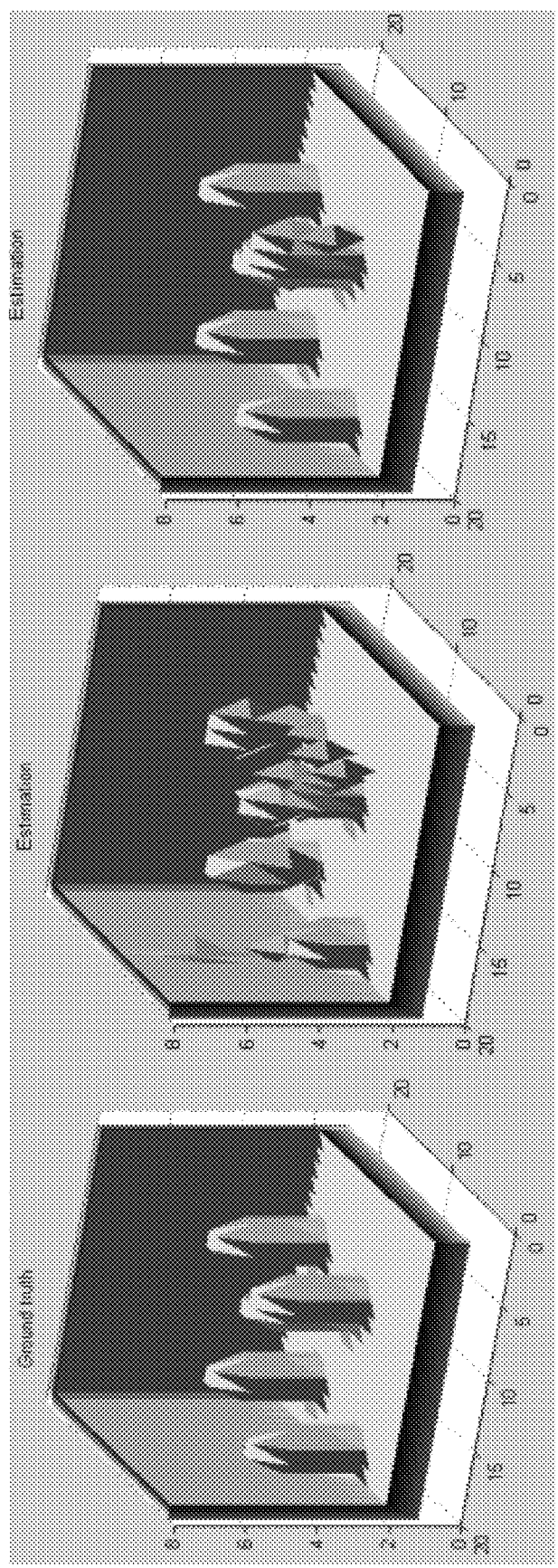
FIG. 4 is scene target information reconstructed by different models.

After environment initialization, a pulse amplitude modulated signal is generated as a detection signal, and based on the detection signal, sparse representation dictionaries $D_1, \ldots, D_n$ are constructed for each receiver. First, simulated detection is performed on a scene without a target. By simulating the indoor propagation, attenuation and reflection of the detection signal, and adding Gaussian white noise, background reflection signals that should be received by each receiver may be calculated, and record as $b_1, \ldots, b_4$. Then, five objects are randomly placed in the scene, and the indoor propagation, attenuation and reflection of the signal are simulated again, and an overall reflected signal that should be received by each receiver may be calculated, and recorded as $z_1, \ldots, z_4$. $y_1 = z_1 - b_1$, $y_2 = z_2 - b_2$, $\ldots$, $y_4 = z_4 - b_4$. An overall sparse representation dictionary $$D = \begin{bmatrix} D_1 \\ \ldots \\ D_4 \end{bmatrix}$$

and an overall received signal $$y = \begin{bmatrix} y_1 \\ \ldots \\ y_4 \end{bmatrix}$$

are constructed. By respectively constructing a sparse representation model $$\min_x \frac{1}{2}\|y - Dx\|_2^2 + \lambda\|x\|_1 \quad (1)$$

and a dimensionality-reduced sparse representation model $$\min_x \frac{1}{2}\left\|U_k^T y - \sum_k V_k^T x\right\|_2^2 + \lambda\|x\|_1, \quad (2)$$

a three-dimensional information vector x of the scene is solved. x solved in the model (1) is as shown in FIG. 3 (a), and x solved in the model (2) is as shown in FIG. 3 (b). The red line in the figure represents a real coefficient of the signal, and the blue line represents an estimated coefficient. Because the received signal contains noise, coefficients estimated by model (1) are not very accurate. In contrast, coefficients recovered by the model (2) are closer to a true value, and it can be seen that the model (2) is more suitable for situations with higher noise levels. By rearranging x, the elements of x are arranged in each voxel, and a 3D target positioning result shown in FIG. 4 is obtained. The left figure is a real scene, the middle figure is a 3D target recovered from the solution of the model (1), and the right figure is a 3D target recovered from the solution of the model (2). It can be seen that the model (2) is more suitable for recovering real 3D targets when there is noise.

The same or similar reference numerals correspond to the same or similar parts.

The description of the positional relationship in the drawings is only for illustrative purposes, and should not be understood as a limitation on this patent.

Obviously, the foregoing embodiments of the disclosure are merely examples for clearly explaining the disclosure, and are not intended to limit the embodiments of the disclosure. For those of ordinary skill in the art, other different forms of changes or modifications can be made on the basis of the above description. There is no need and cannot be exhaustive for all implementations. Any modification, equivalent replacement and improvement made within the spirit and principle of the disclosure shall be included in the protection scope of the claims of the disclosure.

What is claimed is:

1. An active three-dimensional scene information acquisition method based on dimensionality-reduced sparse representation, comprising the following steps:
    S1: calibrating an active detection system, the active detection system comprising a transmitter and a plurality of one-dimensional detection signal receivers;
    S2: detecting a detected scene, and collecting a multi-channel detection signal within a detection period; and
    S3: establishing and solving a sparse representation optimization model according to a calibration result and the collected detection signal.

2. The active three-dimensional scene information acquisition method based on dimensionality-reduced sparse representation according to claim 1, wherein a specific process of step S1 is:
    making the transmitter and the receivers of the active detection system face towards an open area in which there is only one object, starting the transmitter to transmit a detection signal s, recording a waveform of a single reflected signal received by each receiver, the received waveforms being recorded as $s_1, s_2, \ldots, s_n$, where n is a number of the receivers, and completing the calibration for the active detection system after completely recording the received waveforms.

3. The active three-dimensional scene information acquisition method based on dimensionality-reduced sparse representation according to claim 2, wherein a specific process of step S2 is:
    placing a plurality of receivers at a position that is not coplanar with the transmitter, a distance from the transmitter being not less than L, and for a detection signal with a wave velocity of v and a duration of t, $L \geq vt$;
    making the transmitter and the receivers face the detected scene, when target information in the scene is to be acquired, activating step S21, and when a three-dimensional structure of the scene is to be acquired, activating step S22;
    S21: transmitting a detection signal s to a scene without a target, recording signals $b_1, b_2, \ldots, b_n$ received by each receiver, when a target appears in a scene, transmitting a detection signal s to the scene with the target, and recording signals $z_1, z_2, \ldots, z_n$ received by each receiver, $y_1=z_1-b_1, \ldots, y_2=z_2-b_2, \ldots, y_n=z_n-b_n$; and
    S22: transmitting a detection signal s to a scene, and recording signals $y_1, y_2, \ldots, y_n$ received by each receiver.

4. The active three-dimensional scene information acquisition method based on dimensionality-reduced sparse representation according to claim 3, wherein a specific process of step S3 is:
    S31: dividing the detected scene into a plurality of voxels, and establishing sparse representation dictionaries $D_1, D_2, \ldots, D_n$, wherein a $j^{th}$ column of elements of the $j^{th}$ dictionary $D_j$ is a waveform that should be received by the $j^{th}$ receiver when the $j^{th}$ voxel has an object, and may be approximated by $s_i$ translating to a corresponding position;
    S32: constructing an overall sparse representation dictionary $$D = \begin{bmatrix} D_1 \\ D_2 \\ \ldots \\ D_n \end{bmatrix}$$

and an overall received signal $$y = \begin{bmatrix} y_1 \\ y_2 \\ \ldots \\ y_n \end{bmatrix},$$

the dictionary D being a matrix of p×q, estimating a noise level $\sigma_D$ of the dictionary and a noise level $\sigma_s$ of the received signal, if $\sigma_D^2/\|D\|_F^2 \leq \tau$ and $\sigma_s^2/\|y\|_2^2 \leq \tau$, activating step S33, otherwise, activating step S34, a threshold $\tau$ being 0.05;
    S33: establishing and solving an optimization model $$\min_x \frac{1}{2}\|y - DWx\|_2^2 + \lambda\|Wx\|_1,$$

where $\lambda = \sigma_s\sqrt{2\log q}$, so as to obtain three-dimensional information Wx of the scene; and
    S34: assuming m=min (p,q), and taking an appropriate k, so that $$\sum_{i=1}^{k} \omega_i^2 \Big/ \sum_{i=1}^{m} \omega_i^2 \approx \sigma_s^2/\|y\|_2^2;$$

performing singular value decomposition on the dictionary D to obtain $D = U\Sigma V^T$; calculating $D_k = U_k \Sigma_k V_k^T$, where $U_k$ is the first k columns of U, $V_k$ is the first k columns of V, and a diagonal matrix $\Sigma_k$ is an intersection matrix of the first k rows and first k columns of $\Sigma$; and establishing and solving a dimensionality-reduced sparse representation optimization model $$\min_x \frac{1}{2}\|U_k^T y - \sum_k V_k^T Wx\|_2^2 + \lambda\|Wx\|_1,$$

where $\lambda = \sigma_s^2 \log q$, so as to obtain three-dimensional information Wx of the scene.

5. The active three-dimensional scene information acquisition method based on dimensionality-reduced sparse representation according to claim 4, wherein in steps S33 and S34, if a target information in the scene is acquired, a matrix W is an identity matrix; and if a structure information of the scene is acquired, a matrix W is a transformation matrix that makes Wx sparse.

* * * * *